United States Patent Office
3,186,306
Patented June 1, 1965

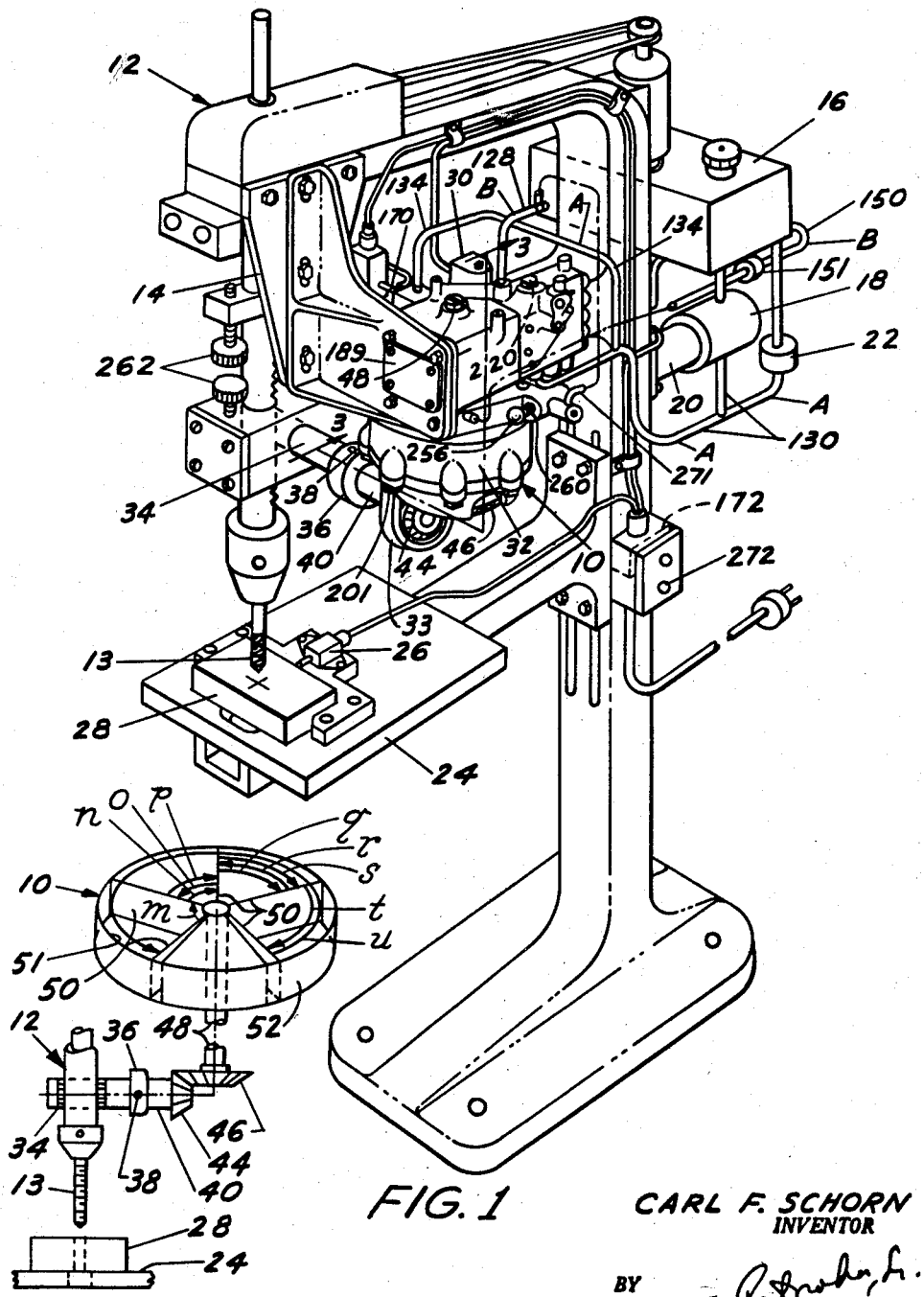

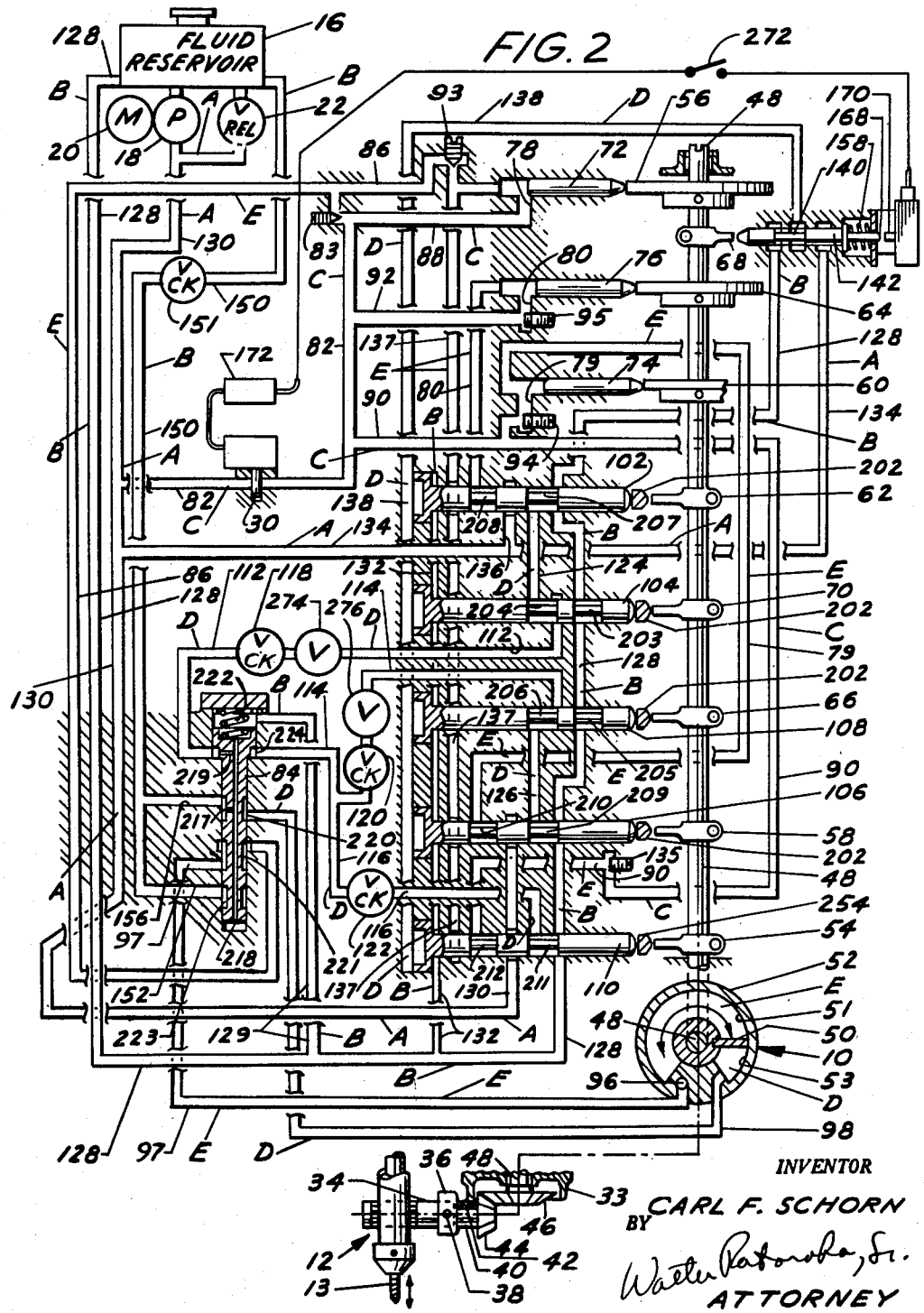

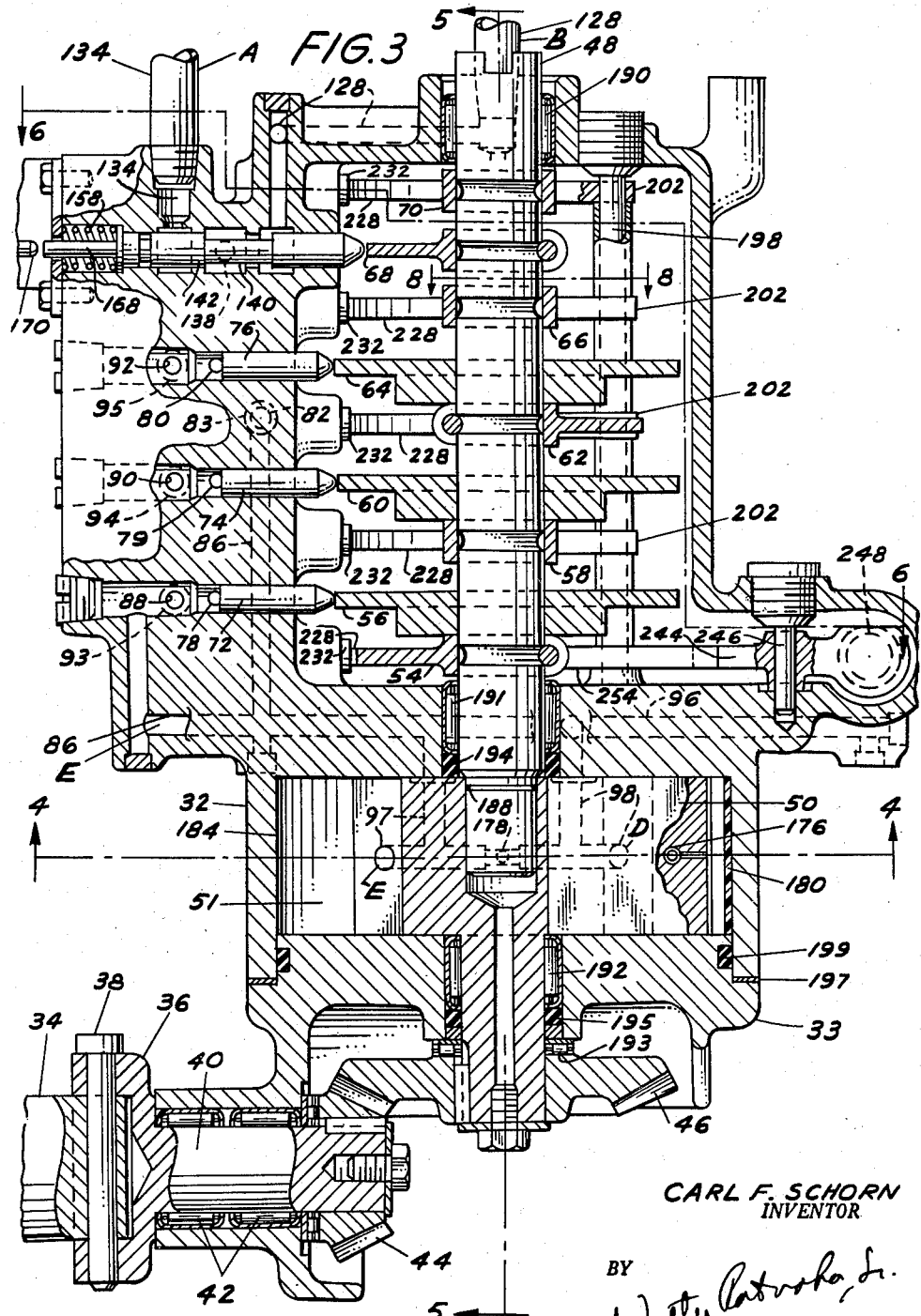

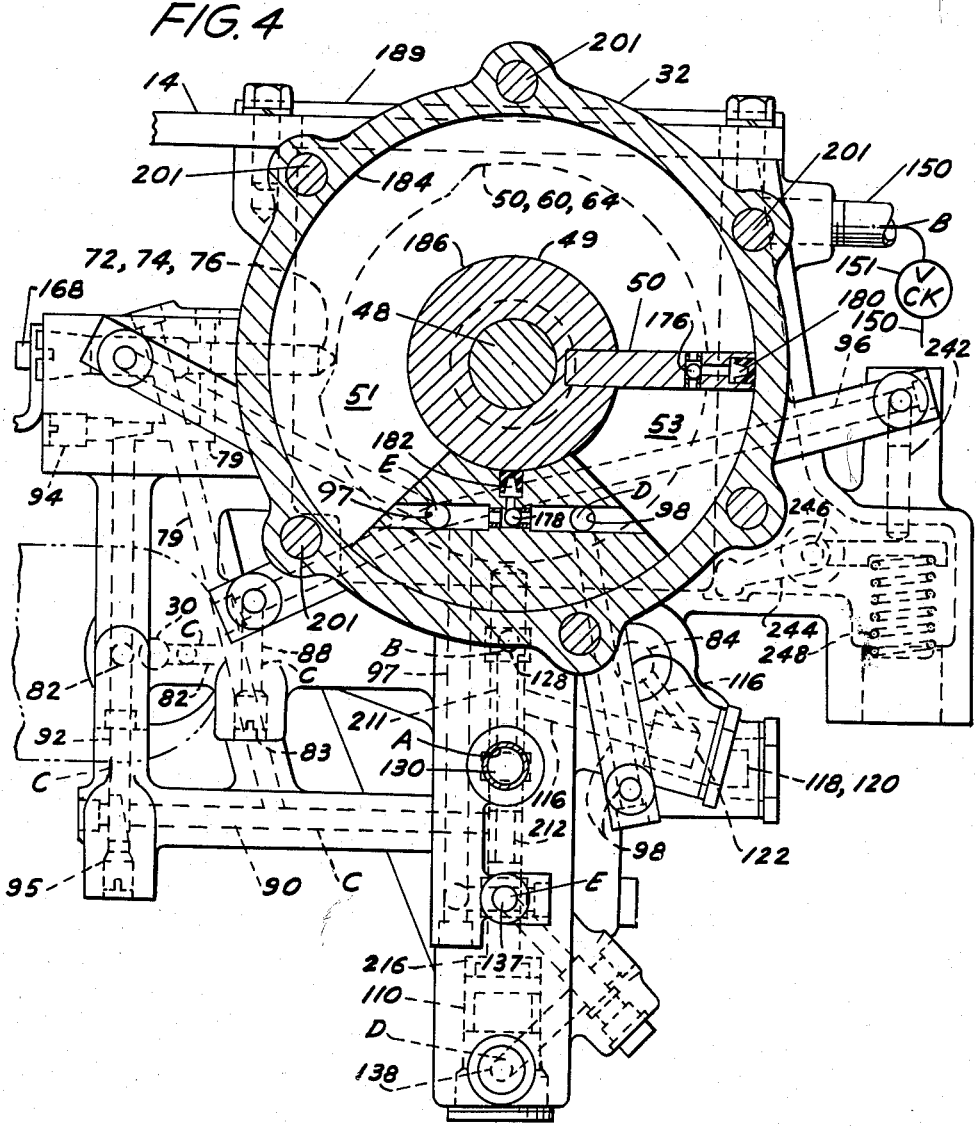

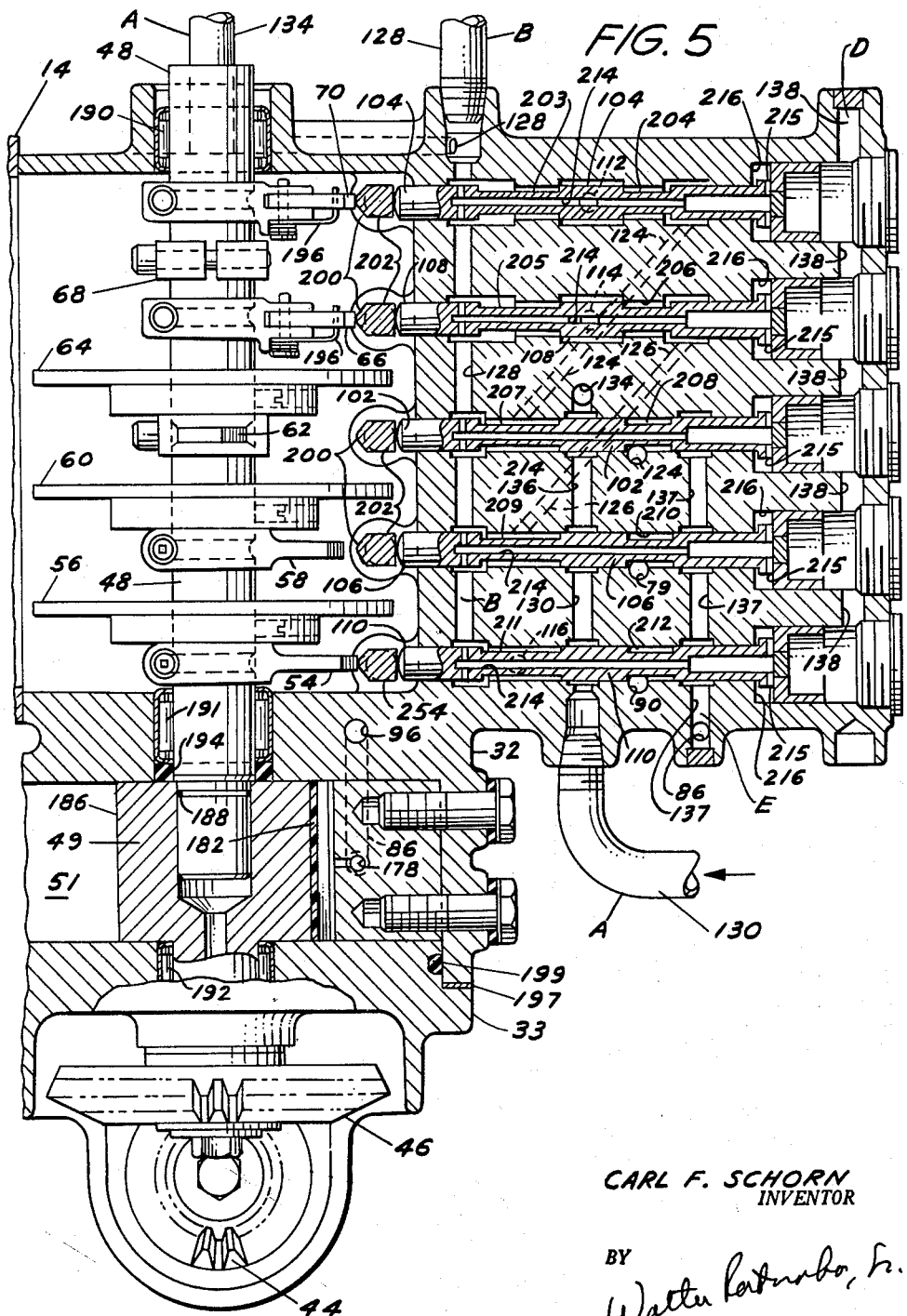

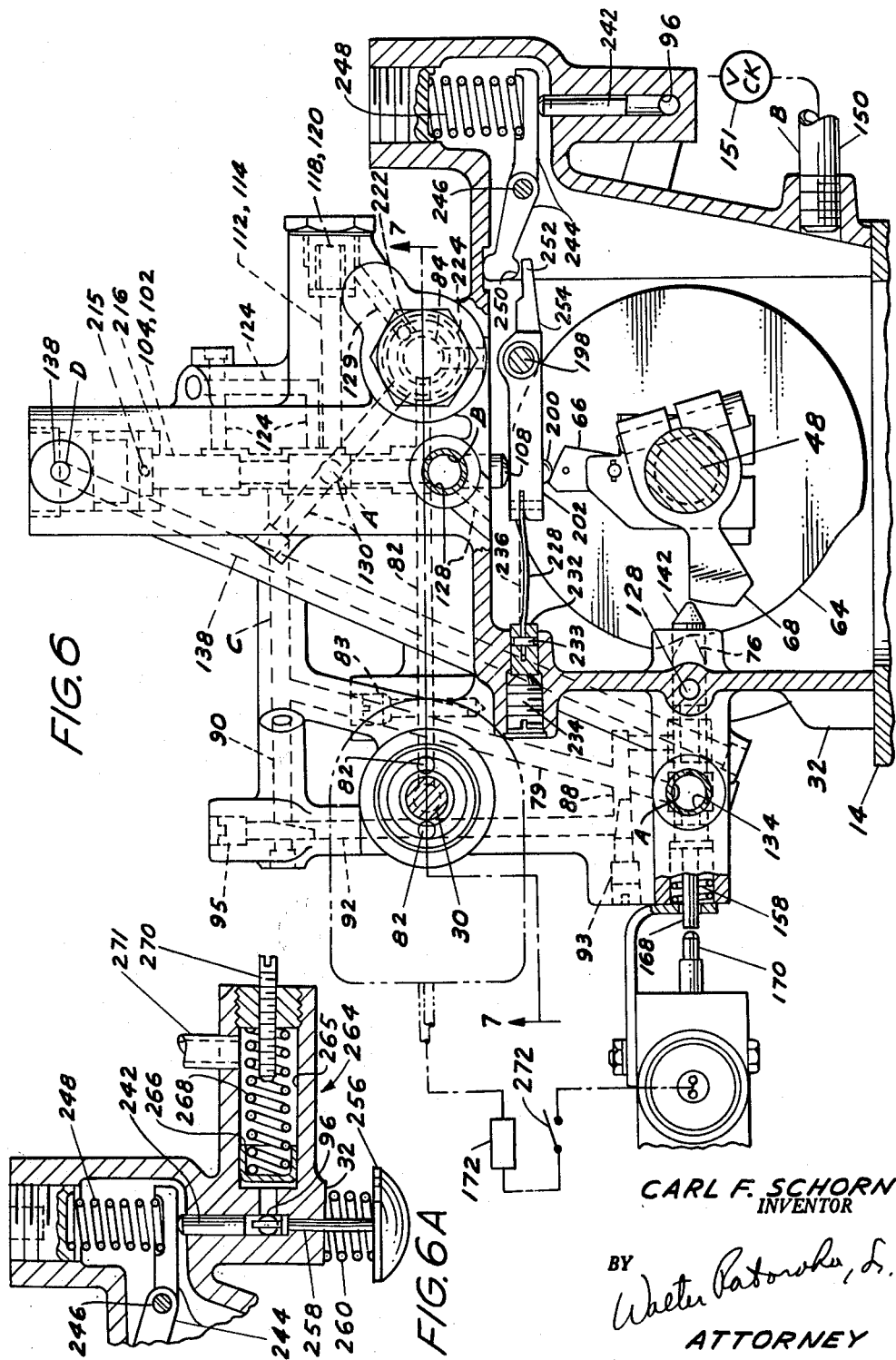

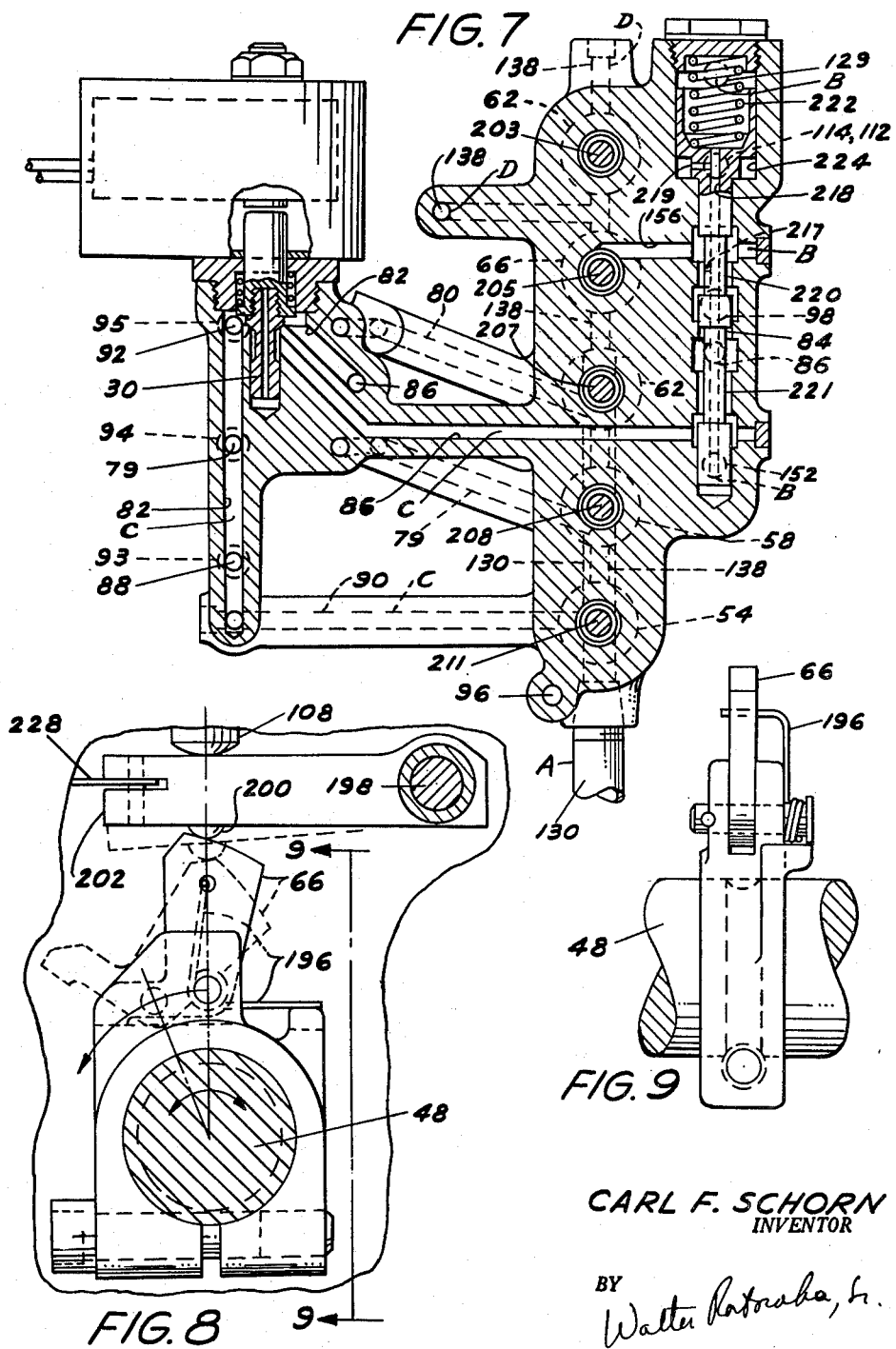

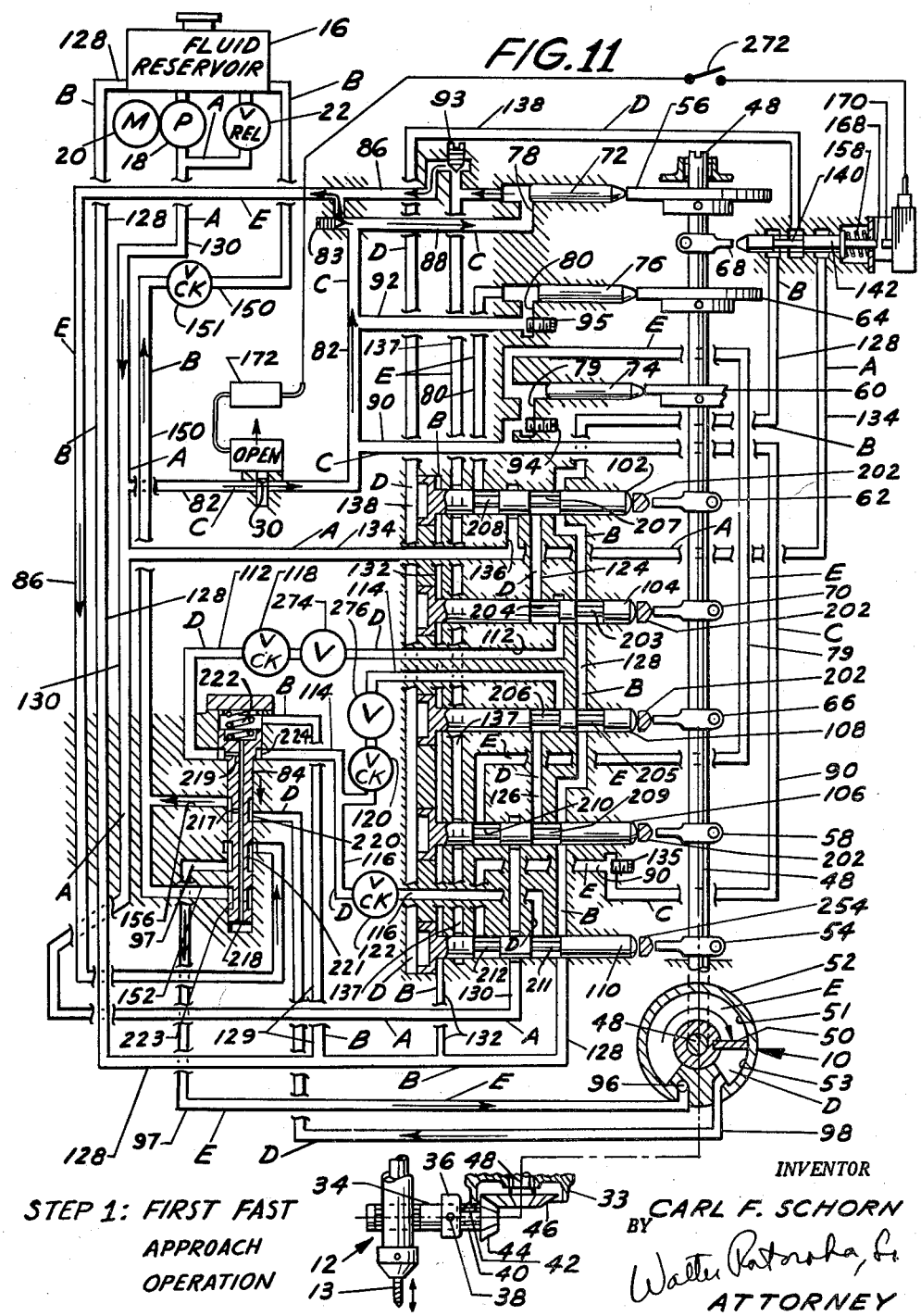

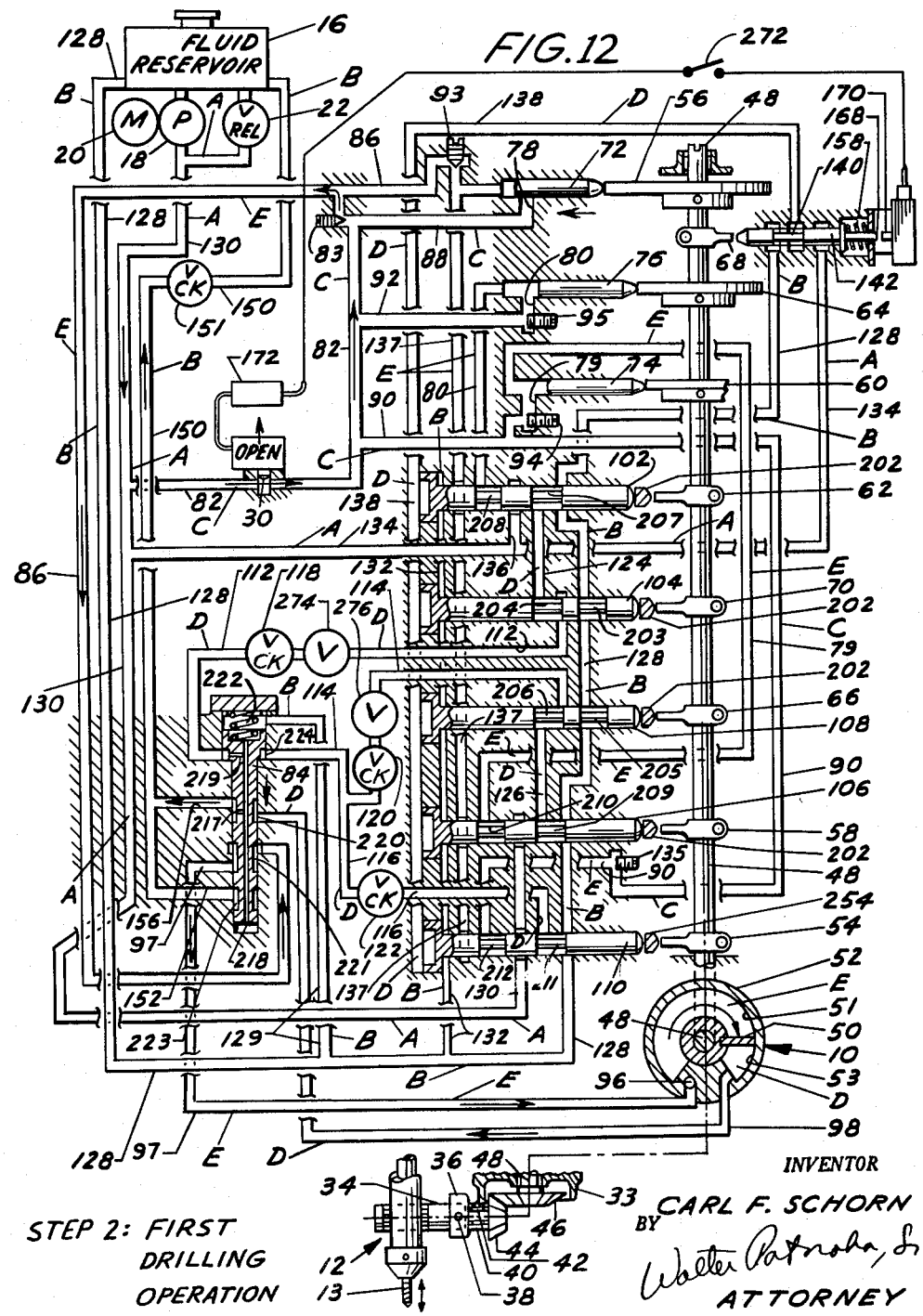

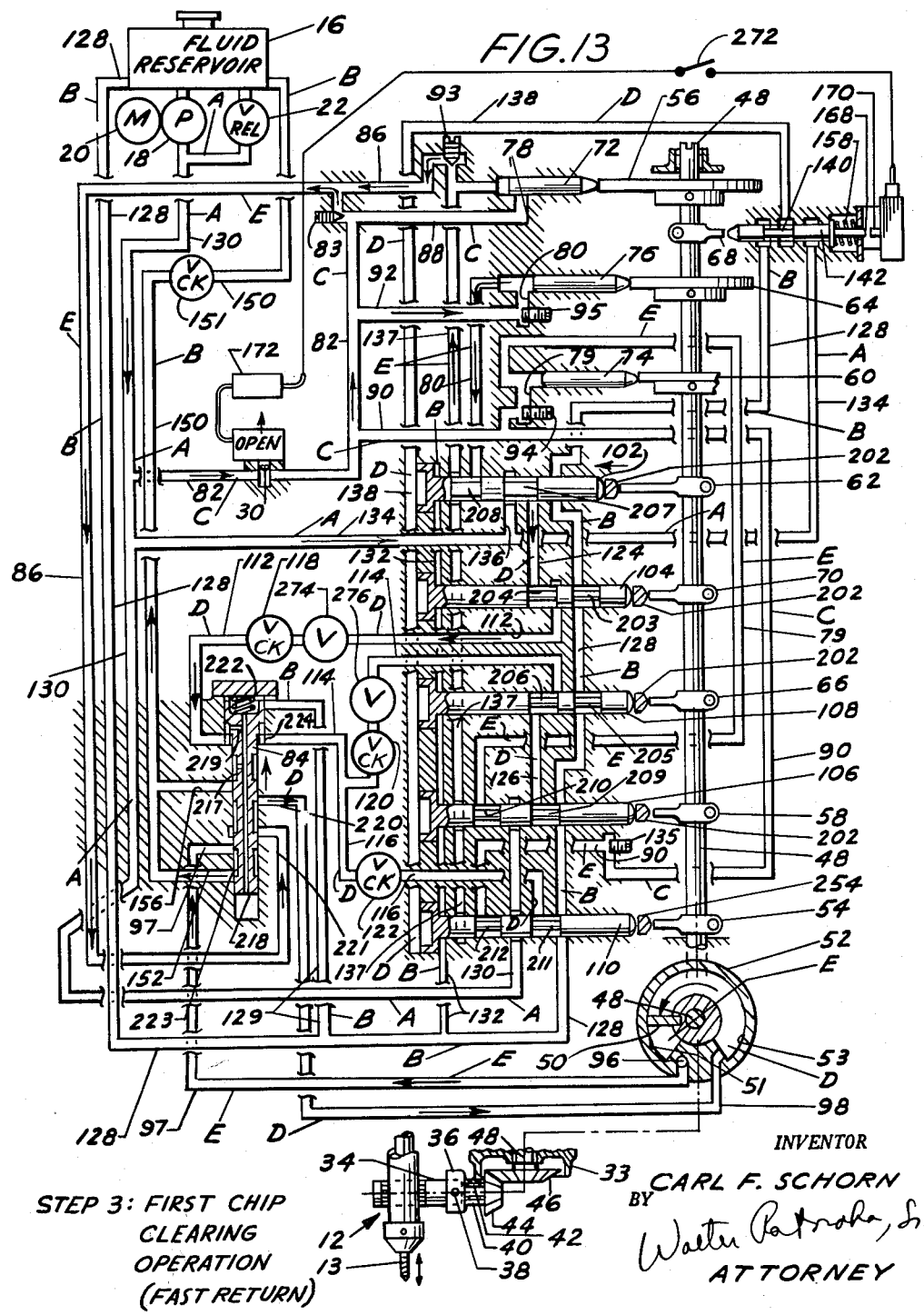

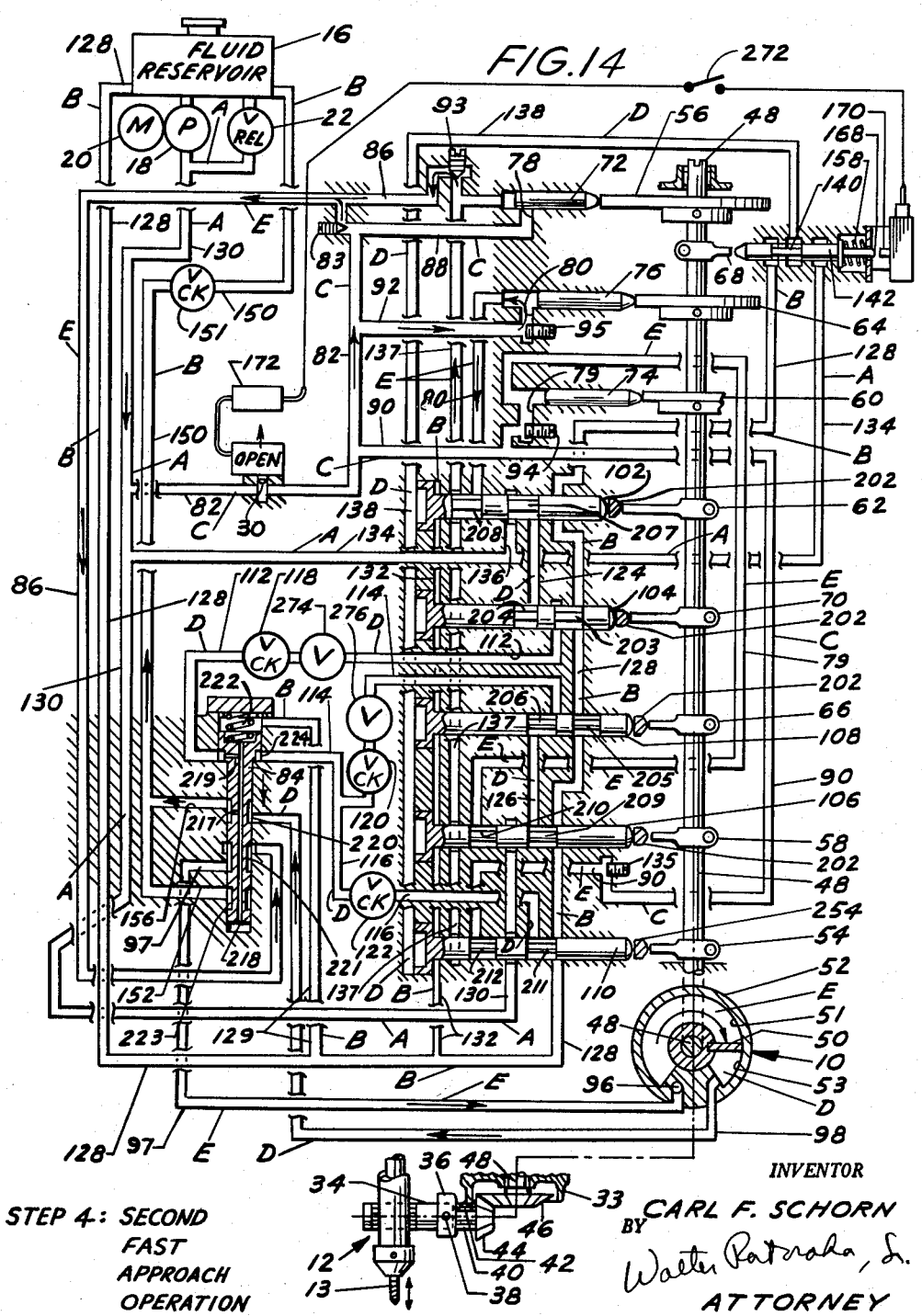

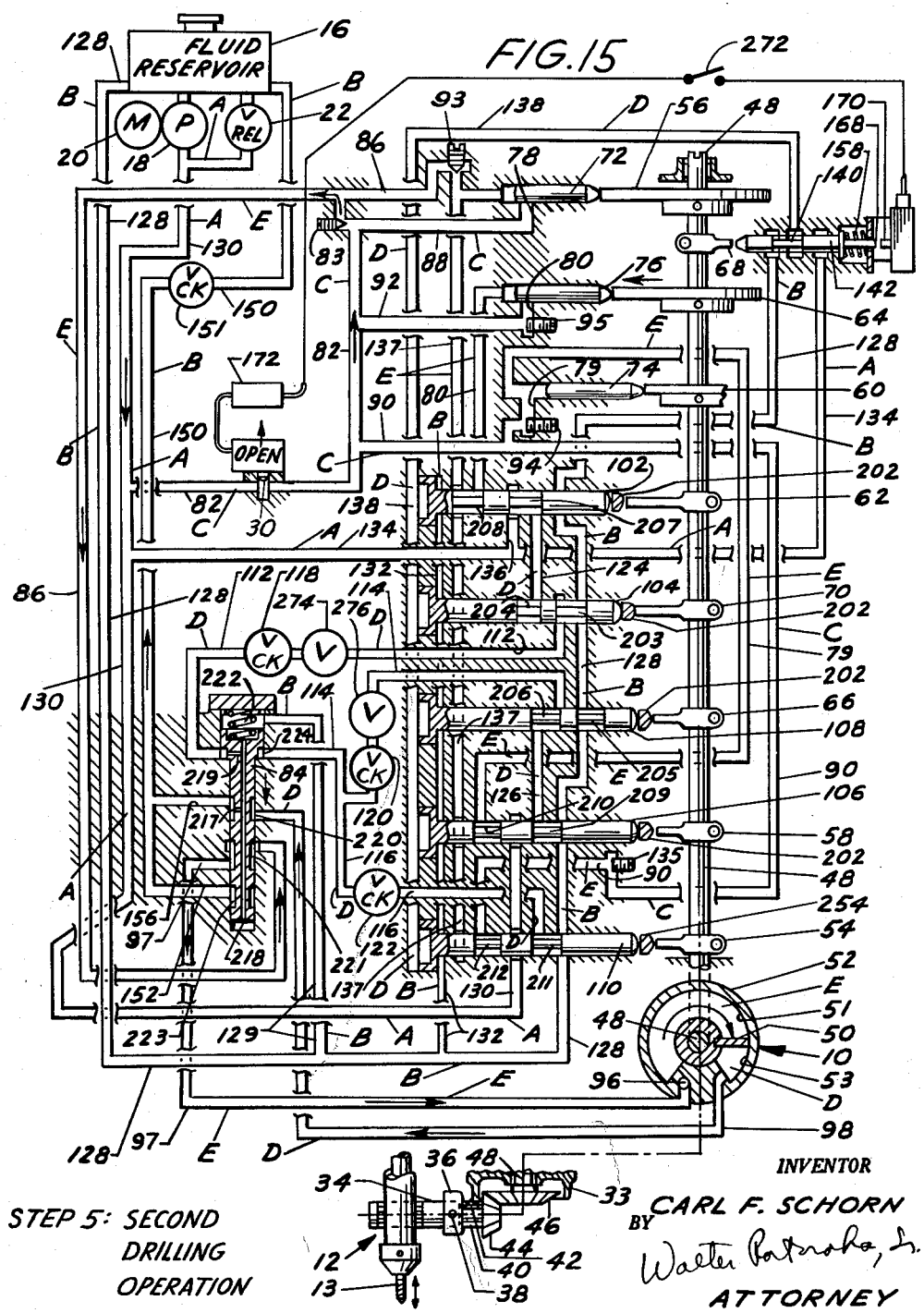

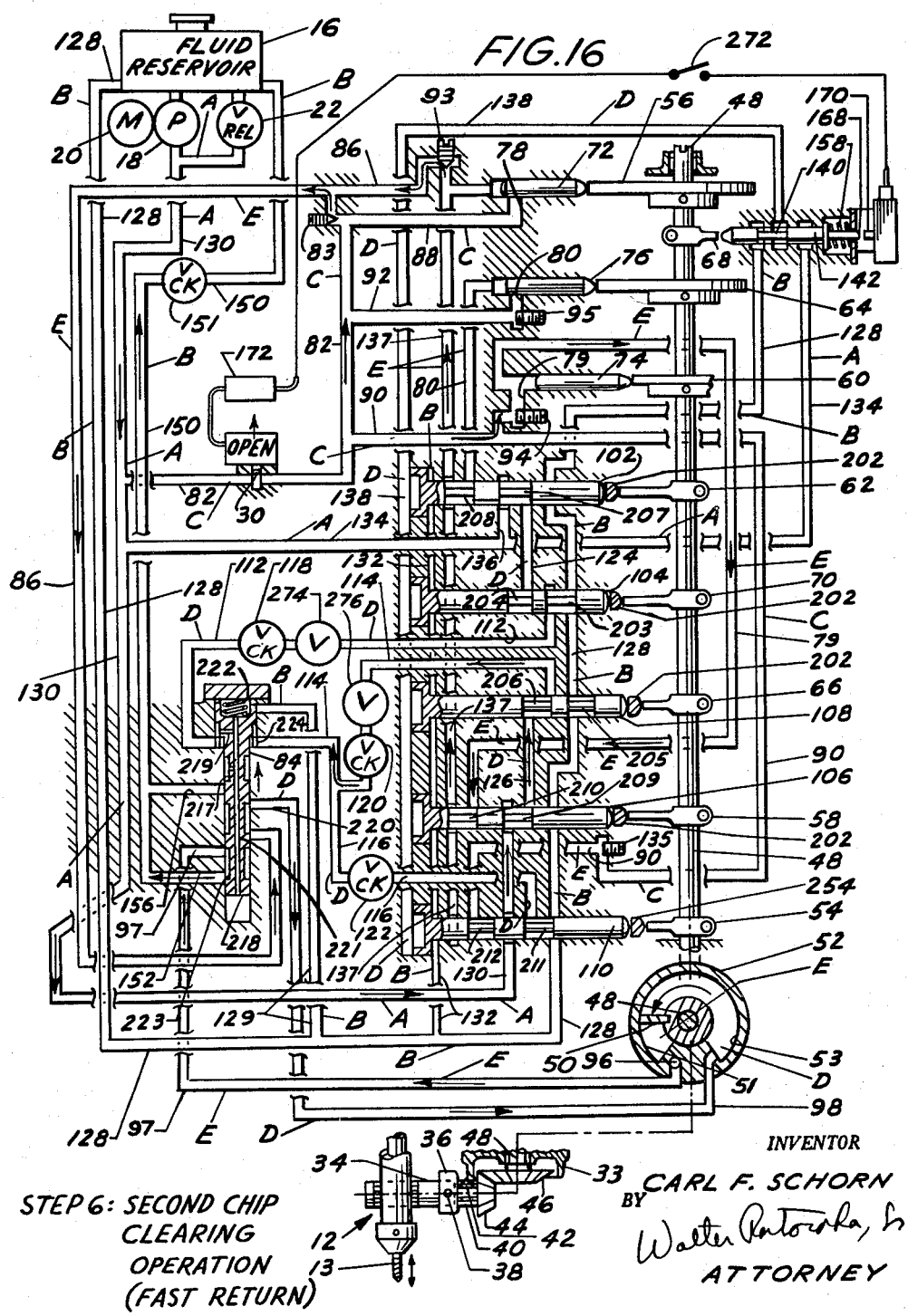

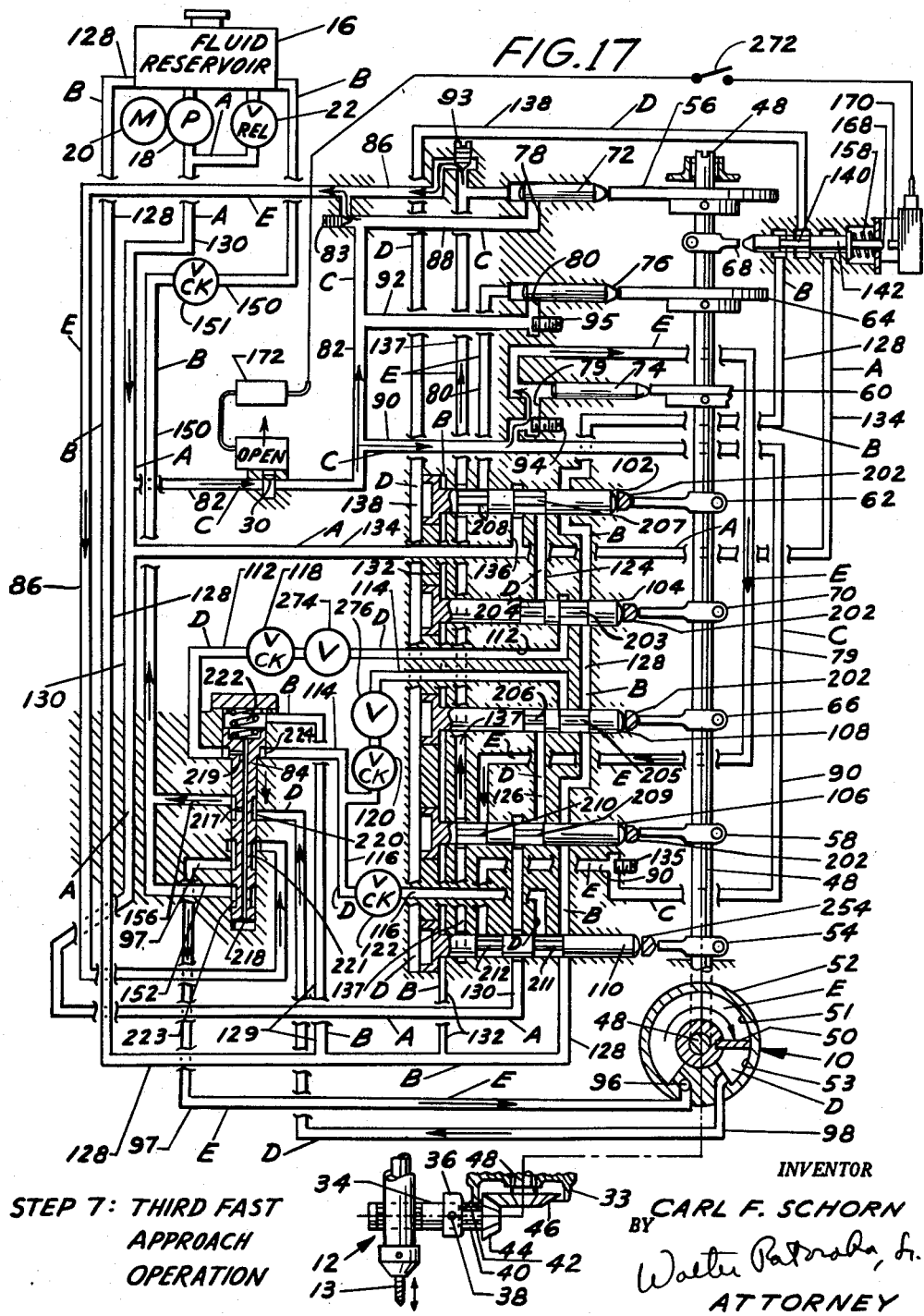
STEP 7: THIRD FAST
APPROACH
OPERATION
INVENTOR
CARL F. SCHORN
BY
Walter Patoraka, Jr.
ATTORNEY

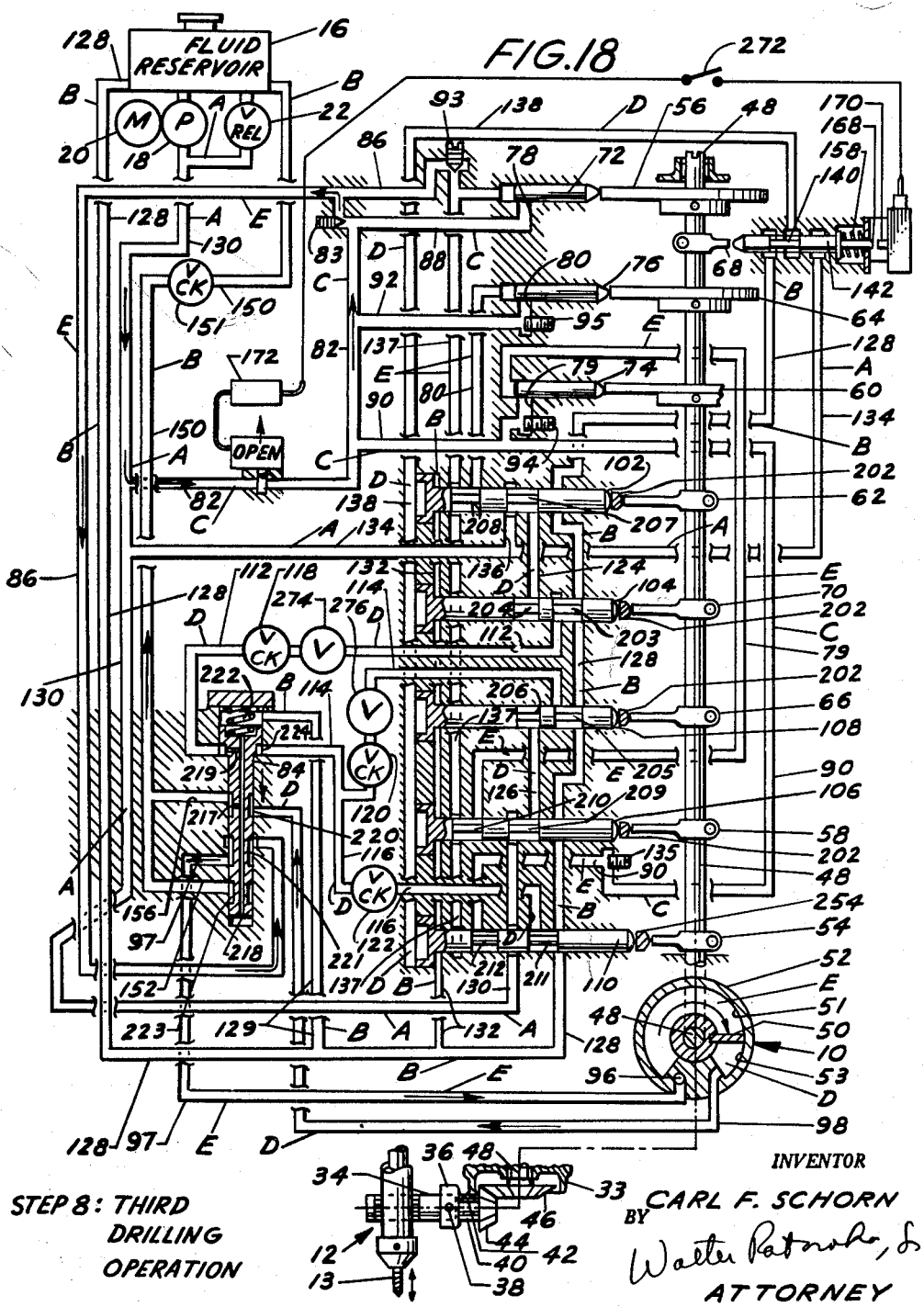

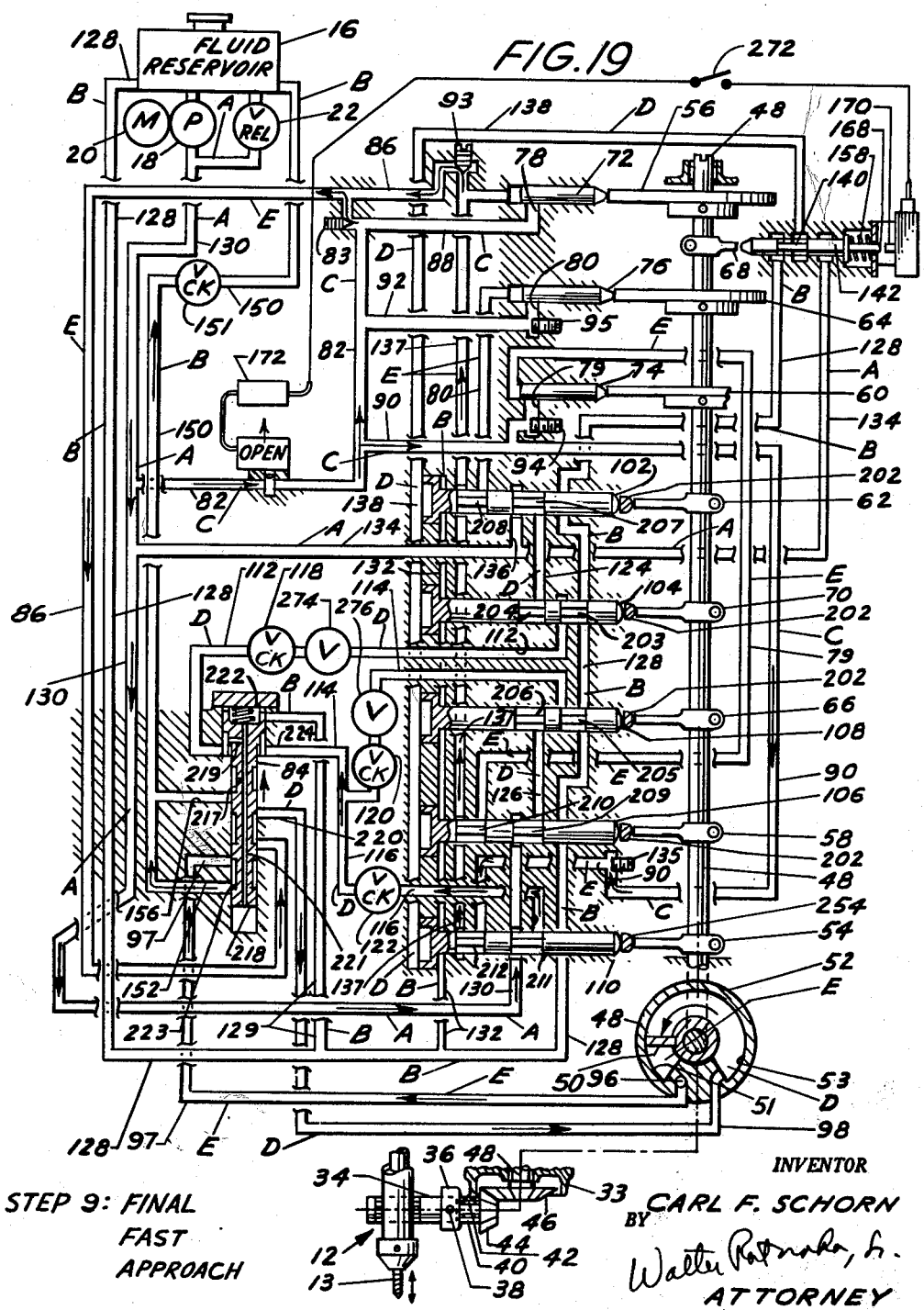

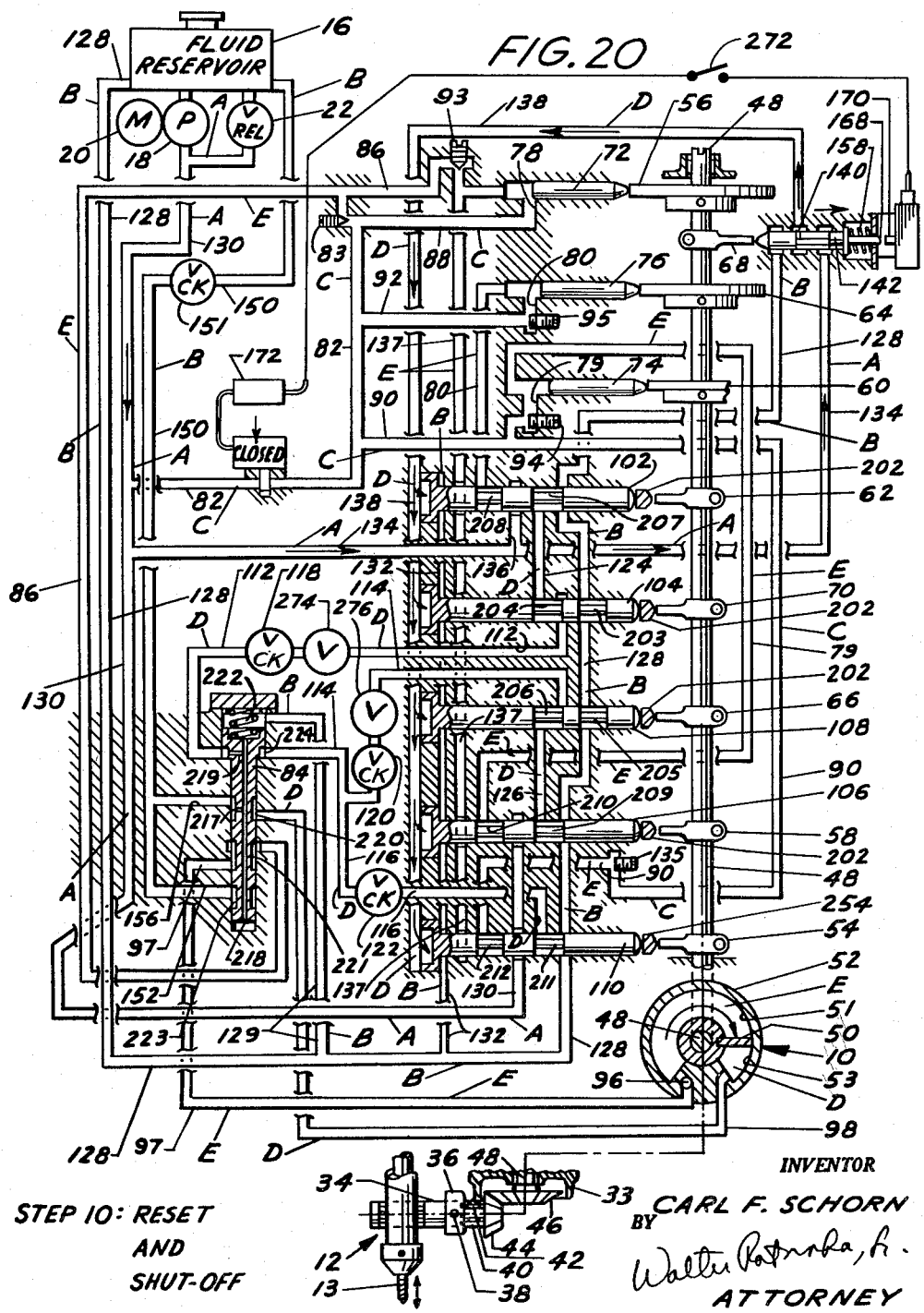

3,186,306
MACHINE CONTROL DEVICE
Carl F. Schorn, Troy, Mich., assignor to Holley Carburetor Company, Warren, Mich., a corporation of Michigan
Filed Nov. 21, 1962, Ser. No. 239,260
9 Claims. (Cl. 91—27)

This invention relates generally to automatic control mechanisms, and more specifically to a means for controlling and scheduling a machine tool, such as a drill press or the like, in order to automatically position the drill or other tool with respect to the work piece, in accordance with a predetermined series of movements and at varying speeds.

In the use of a drill press, for example, it is often necessary to drill to a particular depth and then to retract the drill in order to remove chips, prior to drilling to a second depth after moving the drill quickly to the bottom of the originally drilled hole. A mechanism capable of automatically performing the desired operational sequences would be desirable. For example, it would make a completely automated line possible by enabling the use of a conveyor or other suitable material handling system, thus reducing costs and improving quality.

Accordingly, an object of the invention is to provide automatic means for positioning a member such as a drill or other tool with respect to some other member such as a work piece.

Another object of the invention is to provide a control mechanism having a novel hydraulic motor and cam means which may be set up to automatically perform a variety of machining sequences.

Still another object of the invention is to provide such an automatic mechanism which may be readily adapted for mounting on an existing manually operated drill press head or other machine tool.

Other objects and advantages of the invention will become apparent when reference is made to the following description and the accompanying illustrations wherein:

FIGURE 1 is a perspective view of a drill press embodying the invention;

FIGURE 2 is a schematic diagram of the invention;

FIGURE 3 is a cross sectional view taken on the plane of line 3—3 of FIGURE 1 and looking in the direction of the arrows;

FIGURE 4 is a cross sectional view taken on the plane of line 4—4 of FIGURE 3 and looking in the direction of the arrows;

FIGURE 5 is a cross sectional view taken on the plane of line 5—5 of FIGURE 3 and looking in the direction of the arrows;

FIGURE 6 is a cross sectional view taken on the plane of line 6—6 of FIGURE 3 and looking in the direction of the arrows;

FIGURE 6A is an enlarged view of a manual "stroke return and shut down" device.

FIGURE 7 is a cross sectional view taken on the plane of line 7—7 of FIGURE 6 and looking in the direction of the arrows;

FIGURE 8 is an enlarged cross sectional view taken on the plane of line 8—8 of FIGURE 3 and looking in the direction of the arrows;

FIGURE 9 is an enlarged elevational view taken on the plane of the line 9—9 of FIGURE 8 and looking in the direction of the arrows.

FIGURE 10 is a schematic illustration of the capability of the particular embodiment of the invention disclosed.

FIGURES 11-20 are schematic illustrations of the ten operational steps involved in one complete cycle of the invention.

A detailed operational description of the invention follows at the end of this specification. However, in order that the invention may be better understood, a brief general operational description will now be given.

A drill press usually includes a suitable base or support having a table on which the work piece may be mounted, a column on which a rotatable drill spindle is vertically supported, an electric motor or other power unit for rotating the spindle and a manual rack gear means for moving the spindle vertically toward and away from the work piece. The operator, after properly locating the work piece with respect to the axis of the drill, manually brings the drill into contact with the work piece and drills to some depth until he has to retract the drill to remove the chips. This is repeated several times until a hole of sufficient depth has been formed.

A specific object of this invention is to provide an automatic hydro-mechanical device that may be either initially provided or subsequently attached to take the place of the manual spindle positioning means. A device embodying the invention may include a hydraulic pump that may be driven either by a separate motor or by the motor driving the drill, a rotary vane type hydraulic motor for driving the rack gear spindle positioning mechanism, suitable hydraulic conduitry and a series of servo valves operated sequentially by cams fixed on a shaft which is also driven by the vane type hydraulic motor. Other features are also provided, and these will be described in the more detailed description that follows.

When a drill embodying the invention is turned on, the hydraulic pump is put into operation and high pressure fluid is supplied to one side or the other of the vane type motor, depending upon the desired sequence of operation, the latter being determined by the positions of the adjustable cams operating the servo valves. In other words, the hydro-mechanical device comprising the invention automatically positions the drill spindle vertically toward and away from the work piece through a predetermined cycle.

To understand the more detailed discussion which follows, it will be of some benefit to have a basic understanding of the various pressure conditions which prevail throughout the hydraulic system. Accordingly, the following reference letters, which are included in the schematic drawing of FIGURE 2, are applicable to the conduitry system, it being understood that the usual reference numerals are also used to designate individual conduits:

A—conduits which are always subjected to high pressure;

B—conduits which are always subjected to low pressure;

C—conduits which switch from a high pressure to a low pressure and back again as the cycle progresses;

D—conduits which switch from a low pressure to a high pressure and back again as the cycle progresses; and E—conduits which switch from an intermediate pressure to a low pressure and back again as the cycle progresses.

Referring now to the drawings in greater detail, FIGURE 1 illustrates the proposed automatic drill feed control mechanism 10 mounted on a drill press 12 through a mounting bracket 14 and having a suitable oil reservoir 16, pump 18, motor 20 and pressure relief valve 22 associated therewith. It is to be understood that the pump 18 may be a hydraulic pump, an air pump or, in conjunction with the reservoir 16, an air pressured fluid reservoir.

Mounted on the work table 24 of the drill press 12 is a well-known limit switch 26 which, upon being contacted by the work piece 28, actuates a solenoid operated shut-off valve 30 to start the cycle. The control mechanism 10 is enclosed in a housing 32 of aluminum or other suitable material and is operably connected to the usual manual spindle control shaft 34 of the drill press 12 by a coupling 36 and a stud 38.

The control mechanism structure will now be described by referring generally to FIGURE 2, with appropriate references to the other figures for specific structural details.

The coupling 36 has an extension 40 rotatably mounted in the bearings 42 provided in the cover portion 33 for the cylindrical hydraulic motor housing 52 extending from the main housing 32. A bevel gear 44 secured to rotate with the extension 40 meshes with another bevel gear 46 secured to the shaft 48. The portion of the shaft 48 within the housing 52 has an enlarged cylindrical member formed or secured thereon from which a vane 50 extends laterally, the vane 50 forming separate chambers 51 and 53 within the housing 52. With this construction, it can be seen that a vane 50 will rotate the shaft in one direction or the other, depending upon which of the chambers 51 and 53 contains the higher pressure (see FIGURES 3 and 4). Horizontally disposed cams 54, 56, 58, 60, 62, 64, 66, 68 and 70 (see FIGURES 3 and 5) are also secured on the shaft 48 for rotation therewith, and the operation and function of these cams will be described later.

Plungers 72, 74 and 76 continually ride against cams 56, 60 and 64, respectively, and are at times moved outwardly by the cams so as to cut off the flow of hydraulic fluid through conduits 78, 79 and 80, respectively (FIGURE 3). A conduit 82, containing a manually adjustable restriction 83, communicates between a high pressure conduit 130 and a conduit 86. Branch conduits 88, 90 and 92, the latter two containing manually shut-off valves 94 and 95, respectively, communicate between the conduit 82 and the conduits 78, 79 and 80, respectively. The conduit 86 contains an adjustable restriction 93. The solenoid operated shut-off valve 30 is located in the conduit 82 upstream of the branch conduits 90, 92 and 88.

The conduit 86 communicates between the conduit 82 and the annulus 221 of the selector valve 84. The conduit 97 communicates between the annulus 221 and the chamber 51 of the hydraulic motor housing 52. The conduit 98 communicates between the annulus 220 of the selector valve 84 and the chamber 53 of the housing 52. With the above construction, the vane 50, and thus the shaft 48, is driven in either a clockwise or counter-clockwise direction, depending upon which of the chambers 51 and 53 are supplied with the higher pressure, the latter being determined by the position of the selector valve 84.

A conduit 96 branches off of the conduit 97 at the inlet to the chamber 51 of the housing 52 to provide a feature which may be incorporated in the system, but is not essential to the operation thereof, namely, a safety shut-off in the event of a drill or other tool becoming dull. This will be described in greater detail later.

Pilot valves 102, 104, 106, 108 and 110 are positioned so as to, at times, be actuated by the cams 62, 70, 58, 66 and 54, respectively, as the cams are rotated by the shaft 48 (FIGURE 5). Conduits 112, 114 and 116 communicate between pilot valves 104, 108 and 110 and the selector valve 84 via check valves 118, 120 and 122, respectively, for purposes to be described later. Additionally, conduits 124 and 126 communicate between pilot valves 102 and 104, 108 and 106, respectively, and hence with conduits 112 and 114, during particular positions of pilot valves 104 and 108. Conduit 128 and its branch conduit 132 serve to supply low pressure fluid directly to the five pilot valves referred to above and, via a branch conduit 129, to the top of the selector valve 84. High pressure fluid is supplied to pilot valves 110 and 106 via a conduit 130 and the selector valve 84, with conduit 126 at times receiving this high pressure fluid from conduit 130, depending upon the position of pilot valve 106. Likewise, high pressure fluid is supplied to pilot valve 102 via the conduit 130 and branch conduits 134 and 136 and thence, at times, to conduit 124, depending upon the position of pilot valve 102. The conduit 99, previously mentioned as communicating between conduits 82 and 79, further communicates between the conduit 82 and the pilot valve 110, and it includes a shut-off valve 135. Depending upon the position of pilot valves 110, 106 and 102, the conduits 90, 79 and 80 at times communicate with a conduit 137 which branches into the conduit 86 through the restriction 93.

Low pressure fluid is, at times, provided in the passage 138 extending across one end of the five pilot valves 102, 104, 106, 108 and 110, via the conduit 128, across the annulus 140 of a servo valve 142 and thence to the passage 138. At other times, during a different position of the servo valve 142, high pressure oil is supplied to the passage 138 via the conduit 134, to the servo valve 142 and thence to the passage 138.

Depending upon the position of the selector valve 84, high pressure oil in the conduit 130 and low pressure oil in a conduit 150 and a branch conduit 152 will, alternately, have access to the conduit 86 which, as stated above, communicates with the chamber 51 of the hydraulic motor housing 52. Likewise, high pressure oil in the conduit 86 and low pressure oil in the conduit 150 and branch conduit 156 will, alternately, have access to the conduit 98 and, hence, to the chamber 53 of the housing 52. In order that there will always be a predetermined minimum pressure resisting the movement of the vane 50 in the hydraulic motor 52, such as when the drill 13 is descending without being in contact with a work piece, a back-pressure valve 151 is inserted in the low pressure conduit 150.

The servo valve 142 will normally be biased by the spring 158 to the position shown in FIGURES 2 and 3. As the end of the cycle approaches, the cam 68 will be rotated by the shaft 48 until it contacts the valve 142, thereby bringing the annulus 140 into communication between the conduit 138 and the high pressure conduit 134. At the end of the stroke, i.e., when the servo valve 142 is being contacted by the highest point of the cam 68, the extension 168 extending through the spring 158 will contact the switch 170 which will close the solenoid operated shut-off valve 30 (FIGURE 7) through its associated relay 172.

Additional specific structural details, not discernible from the above description of FIGURE 2, are as follows:

As seen in FIGURE 4, a pair of ball check valves 176 and 178, in conjunction with a pair of seal members 180 and 182, respectively, prevent leakage from one side of the vane 50 to the other, the seal members 180 and 182 serving to wipe the two inner walls 184 and 186 of the housing 52 as the vane 50 and shaft 48 rotate.

In FIGURE 3, the vane 50 can be seen to be brazed to the shaft 48, as at 188. The same figure illustrates the shaft 48 and the vane 50 to be rotatably confined within four bearings 190, 191, 192 and 193 and a pair of seal rings 194 and 195 located in the housing 32. Additionally, the housing 32 is seen to comprise two parts separated by a shim 197 and a seal 199, and fastened together by bolts 201. The housing 32 further includes a front cover 189 (FIGURE 1) which provides access for setting-up or adjusting the cams for each new application or cycle.

Specific cams shapes are illustrated in FIGURES 5, 6, and 8. Cams 56 and 60 are identical to cam 64 (FIGURE 6) except for having different radial positions on the shaft 48. Likewise, cams 62, 58 and 54 are identical to cam 68 shown in FIGURE 6 and are staggered radially on the shaft. Cam 66 is shown located behind cam 68 in FIGURE 6, and is illustrated in greater detail in FIGURES 8 and 9. Cam 70 would be identical to cam 66, which can be seen in FIGURE 8 to include a spring actuator 196. The actuator 196 will bias the cam 66 back into an upright position after it has been rotated toward a horizontal position about the pivot pin 198 by the nib 200 of the lever 202 as they are brought into contact by the shaft 48, when the latter is rotating in a counterclockwise direction. It is when the shaft 48 rotates in a clockwise direction that the cam 66 remains upright and lifts the lever 202, hence actuating the servo valve 108.

The pilot valves 104, 108, 102, 106 and 110 are seen in FIGURE 5 to comprise pairs of annuli 203/204, 205/206, 207/208, 209/210 and 211/212, respectively, which align with different conduits as the valves are shifted axially by their respective cams 70, 66, 62, 58 and 54. Each of the pilot valves further contains a central passageway 214 and a bleed 215 in order that low pressure oil may enter the chamber 216 beneath the heads of the valves and then be returned to the reservoir 16 via the conduit 128 as an individual valve is shifted.

The selector valve 84, illustrated in FIGURE 7, comprises a central passageway 218, bleeds 217 and 219 and annuli 220 and 221, in order to coordinate the high and low pressure conduitry, as will be described later in a discussion of the operation of the complete mechanism. A spring 222 biases the valve 84 in one direction, and it is at times compressed by the entry of high pressure oil into the chamber 224, as will also be described later.

FIGURES 3 and 6 further illustrate a "snap-action" technique which may be utilized in conjunction with the cams 70, 66, 62, 58 and 54 to assure a fast projection of the servo valves to their farthermost positions away from the cams. In other words, levers 202 and associated springs 228 are inserted between the cams 70, 66, 62, 58 and 54 and their respective pilot valves 104, 108, 102, 106 and 110 as shown in FIGURE 6. In each case, the lever 202 is fastened to the housing 32 at its one end by a pivot pin 198, while the associated spring 228 fastened to the other end of the lever 202, is held in a fixed position by a clamp 232 and a pin 233 confined at a particular location in the housing 32 by an adjustable screw 234. As a particular cam rotates and its highest point approaches the nib 200 of the lever 202, the slightly bent spring 228 is flexed until the bent portion snaps to a symmetrical position through the imaginary center line 236 of the spring 228 in such a manner that the associated pilot valve is, at that instant, projected away from the lever 202 as far as it can go, thereby assuring a completely unrestricted flow around the annuli of the valve and through the appropriate conduits.

A "dull tool feature" may be incorporated in the system, as shown in FIGURES 4 and 6. This feature embodies a device which will perform a function similar to what would normally be performed by the cam 5, but which may occur at any time throughout the sequence of operations. In other words, any time that a tool becomes dull, thereby causing a build up of pressure in the chamber 51, the resultant high pressure will be communicated via the conduit 96 (FIGURE 2) to the underside of the piston 242 illustrated in FIGURE 6. This would cause the piston 242 to be raised, contacting the lever 244 and causing the lever 244 to be pivoted about the pivot point 246. Once the pressure is sufficient to overcome the spring 248, the hammer end 250 of the lever 244 will contact the extension 252 of the lever 254 (FIGURE 3), which, except for the extension 252, is similar to the lever 202. This results in the lever 254 being lifted against the pilot valve 110, as if it were being raised by the cam 54, thereby closing the shut-off valve 30, subjecting the tops of all the pilot valves 102, 104, 106, 108 and 110 to high pressure and cocking them for the next cycle in a manner which will be described later.

A manual emergency "stroke return and shut down" device is illustrated in FIGURE 6A which may be used in conjunction with the dull tool feature described above. If an operator were to depress the button 256 in the event of an emergency, the button extension 258 would force the piston 242 upwardly, producing the result described in the immediately preceding paragraph, wherein the piston 242 was actuated for a different reason. Normally, the extension 258 would be biased away from the piston 242 by the spring 260 located between the button 256 and the housing 32.

Additionally, an "adjustable dwell feature" may be incorporated in conjunction with the dull tool feature for additional operations such as spotfacing a hole after the usual drilling and chip clearing processes. This feature is as illustrated in FIGURE 6A, along with an adjustable limit stop 262 as shown in FIGURE 1. The limit stop 262 would be set so as to produce a desired depth of spotface. Once a spotfacing cutter is stopped by the limit stop 262, hydraulic pressure will build up in the chamber 51 of the hydraulic motor 52 much the same as would happen if a drill 13 were to become dull. An accumulator assembly 264 provides for a dwell the duration of which during the spotfacing operation may be adjusted as desired. As the pressure builds up in the chamber 51 and is transmitted to the dull drill system via the conduit 96, the piston 266 is forced to the right, compressing the spring 268, until the piston 266 contacts an adjustable screw 270. Low pressure fluid in the chamber 265 of the accumulator 264 will be displaced back to the reservoir 16 via a conduit 271 which could tie into the low pressure conduit 128. Thereafter, the piston 242 will be raised as previously described, thereby retracting the spindle and cocking the system for the next cycle.

Tapping can also be accomplished by any of the commercially available tapping attachments. The cams need only be set for a fast approach to the work piece 28, followed by a rate of feed suitable for the size of tap and the material involved, and then for a slow retraction back through the work piece 28, prior to a fast return to the shut off position. This is accomplished by shutting off valves 94, 95, 135 and 274 and 276, resulting in the entire schedule being determined by the settings of restrictions 83 and 93 and the operation of the plunger 72 in response to the setting of the cam 56. The setting of the cam 54 determines the point of tool return as previously explained.

A manual emergency "feed stop" device may also be incorporated in the system. This involves merely inserting a normally closed switch 272 in the line between the relay 172 and the switch 170. Manually opening the switch 272 at any time would close the solenoid operated shut-off valve 30 and stop the movement of the drill 13 until the switch 272 is once again manually closed.

*Operation*

A typical operation of the invention, wherein all the cams illustrated could be utilized, may best be explained by referring to the FIGURES 11-20 schematic diagrams, wherein the various operational steps are illustrated. It is to be understood that a different number of cams may be desired and that different settings may be employed for any given application.

When the work piece 28 is placed onto the work table 24 by an operator, it actuates the spring loaded solenoid-operated shut-off valve 30 to an open position (FIGURE 11) by depressing the limit switch 26, as illustrated in FIGURE 1, or by any other suitable means, thereby starting the control mechanism 10. Hydraulic fluid is then pumped from the reservoir 16 toward chamber 51 of the rotary servo motor 52 via conduits 130, 82, 88 and 86, past adjustable restrictions 83 and 93 and through the valve 30. This fluid under high pressure serves to rotate (clockwise in FIGURE 11) the servo vane 50, and hence, the shaft 48 on which the cams 56, 68, 64, 60, 62, 70, 58, 66 and 54 are attached at various predetermined angles relative to one another. Chamber 53 of the rotary servo motor 52 would at this time be subjected to fluid under low pressure via conduits 150, 156 and 98.

The above described rotation of the shaft 48 actuates the power train including bevel gears 46 and 44, the coupling 38 and shaft 34, thus causing the drill 13 to descend at a relatively fast rate into close proximity with the work piece 28. The cam 56 would be adjusted on the shaft 48 so that as the drill 13 approaches the work piece 28, the cam 56 would motivate the plunger 72 to its farthermost point away from the shaft 48, thereby closing off the flow of fluid past restriction 93 (FIGURE 12). With flow past the restriction 93 now being cut off, the remaining fluid flow through the conduits 86 and 97 to the chamber 51, past restriction 83, is of such a lesser volume that the drill will descend at a slower rate suitable for the initial drilling operation. The restrictions 83 and 93 may be manually adjusted in order to provide for different feed rates during the fast descent, ascent, and/or drilling sequences. The shape of the cam 56 is such that the plunger 72 will continue to block the flow through the conduit 78 until the cycle has been completed.

The first drilling sequence will continue until the shaft 48 has rotated the cam 62 to a position where it actuates the pilot valve 102 (FIGURE 13), thus permitting high pressure fluid to enter chamber 53 of the housing 52. This is accomplished by means of high pressure fluid from conduit 130 and its branch conduit 134 moving the selector valve 84 upwardly in FIGURE 13, the flow being via conduit 136, annulus 207 of valve 102, conduit 124, annulus 204 of valve 104, conduit 112, check valve 118 and into chamber 224. Once the pilot valve 102 has moved, additional fluid is supplied to the conduit 86 via conduits 78 and 88, past restriction 93, providing a fast retraction of the drill 13. This is accomplished by virtue of the plunger 72 following the cam 56.

In its new position, the selector valve 84 now serves to allow high pressure fluid to flow from conduit 86, around the annulus 221, into conduit 98 and hence into chamber 53. At the same time, the fluid in chamber 51 (FIGURE 13) is subjected to low pressure, rather than high pressure, since the conduit 97 now receives its supply of fluid from conduits 152 and 150 via the annulus 223, rather than through the annulus 221. Obviously, the result is reversal of the direction of rotation of the shaft 48 and a relatively fast retraction of the drill 13 away from the work piece 28, which enables clearing of chips from the drilled hole.

The drill will continue to be raised from the hole until cam 70 lifts the pilot valve 104 (FIGURE 14) to a position where conduit 112 is subjected to low pressure fluid from conduit 128, via the annulus 203, thus cutting off the high pressure flow from conduit 124. This again shifts the selector valve 84 (FIGURE 14), subjecting chamber 53 once again to low pressure fluid via conduits 150, 156 and 98 and the annulus 220, at the same time, the chamber 51 is subjected to high pressure fluid via conduit 97 and annulus 221. Thus, the drill will once again move rapidly toward the work piece, since high pressure fluid is now able to enter chamber 51 from conduit 97, which is being fed by conduits 86, 82 and 137. The latter conduit 137 is fed via conduit 92, past the shut-off valve 95, and through conduit 80 and annulus 208 of pilot valve 102.

This second fast descent of the drill will continue until cam 64 forces plunger 76 to the left in FIGURE 15 so as to prevent flow through conduit 80 and past the normally open shut-off valve 95. At this point, drill 13 will have reached the bottom of the previously drilled hole, and a slower advance of the drill again results for the second drilling sequence because chamber 51 is now subjected to flow past the manually adjustable restriction 83 alone, additional flow through conduit 80 having been cut off as just explained. This second drilling operation continues until the shaft 48 rotates the cam 58 into a position wherein it shifts the pilot valve 106 (FIGURE 16) permitting high pressure fluid from conduit 130 to enter conduit 126 via annulus 209 and to thence proceed to the chamber 224 in the selector valve 84 via annulus 206 of pilot valve 108 and conduit 114, past check valve 120. This again raises (see FIGURE 16) the selector valve 84, giving high pressure fluid in conduit 86 access to chamber 53 of the housing 52 via the annulus 221 and conduit 98. At the same time and as was the case in the prior drill retracting sequence, chamber 51 is again subjected to low pressure by virtue of low pressure fluid in conduits 150 and 152 having access to conduit 97 through the annulus 223 of the selector valve 84. The hole is thus once again cleared of chips as the drill 13 is retracted.

Operation of cam 66 (FIGURE 17) is identical to that of cam 70 in quickly bringing the drill down to the bottom of the previously drilled hole.

The last drilling operation available (FIGURE 18) with the specific structure illustrated in FIGURE 2 is timed by cam 60 which has a function identical to that of cam 64, except that the plunger 74 now functions to block off the flow through the conduits 79 and 137 which communicate with the conduit 86. Plunger 76 continues to close off flow through conduit 80 by virtue of the shape of the cam 64, as was the case with the cam 56.

Cam 54 (FIGURE 19) initiates the final retraction of the drill in a manner similar to the operation of cam 58, except that high pressure flow to the chamber 224 through conduit 116 and check valve 122 replace flow through conduits 126 and 114 and check valve 120; this moves the selector valve 84 against the force of spring 222, thus once again subjecting chamber 53 of the housing 52 to high pressure, as previously explained. This final retraction of the drill continues until the cam 68 moves the valve 142 (FIGURE 20) into a position which permits the passage of high pressure fluid from conduits 130 and 134 to conduit 138 via the annulus 140. The high pressure fluid now in conduit 138 serves to subject the tops of all the pilot valves 102, 104, 106, 108 and 110 to high pressure (FIGURE 20), forcing them toward the shaft 48 and thus cocking them for the next cycle. Schematically, the low pressure fluid under the heads of these valves is forced back to the reservoir 16 via conduit 132. In the actual structure, bleeds 215 and passageways 214 may communicate with the low pressure conduit 128 in place of having a conduit 132. By virtue of the movement of the valve 142 as just described, the extension 168 contacts the switch 170, thereby closing the shut-off valve 30 (FIGURE 20) until the next work piece 28 is loaded against the limit switch 26 to start a new cycle.

There may be instances where it is desirable to descend quickly through a void during a particular drilling stroke. An example of this would be the drilling of a throttle shaft bore in a carburetor body. After having descended fast to the carburetor body and then having slowly drilled through to the air induction passage it would be desirable to proceed quickly through the open passage and slow down once again for drilling through the other side, prior to making an ascent for the next cycle. Such an operation would be possible by incorporating a "fast skip feed" provision in the system. This involves the inclusion of two additional valves 274 and 276 in the conduits 112 and 114, respectively.

As long as the valves 274 and 276 remain open, the system will function as previously described. However, when a particular operation warrants a "fast skip feed" sequence, the valve 274 would be manually closed during the "set-up" of the control mechanism. With the valve 274 closed, once the pilot valve 102 is actuated by the cam 62, high pressure fluid which normally would flow from the pump 18 through conduit 130, branch conduits 134 and 136, annulus 207 of pilot valve 102, conduit 124, annulus 204 of pilot valve 104, and conduit 112, through the check valve 118 to shift the selector valve 84, would now be blocked by the closed valve 274, thereby preventing the selector valve 84 from shifting. Thus, the annulus 221 will not have completed communication between conduits 97 and 98 nor between the branch conduit 152 and conduit 86, to reverse the direction of the rotating vane 50 in hydraulic motor 52. Further, the volume of fluid flowing into the chamber 51 of the hydraulic motor 52 will have increased by virtue of high pressure fluid now flowing past the open valve 95, as well as past the restriction 83 into the conduit 86 and thence into conduit 97 via the annulus 221. The additional flow past the open valve 95 into the conduit 86 is made possible via conduits 92 and 80, the annulus 208 and conduit 137.

Once the drill 13 has quickly traversed the void, the cam 64 would have been set to be moved by the shaft 48 into contact with the plunger 76, moving it into position to block the flow past the open valve 95, thus causing the drill 13 to continue descending, but at a slower rate suitable for drilling, as determined by the setting of the restriction 83.

If a second void is to be encountered, the valve 276 in the conduit 114 could likewise be manually closed, producing the same effect as above once the pilot valve 106 is actuated by the cam 58.

There may be instances, after having completed a particular drilling sequence, where it is desired that the drilled hole of the workpiece have additional operations performed thereon, such as lapping, for example. Such an operation would require multiple slow up-and-down motions with a lapping tool. This could be accomplished very simply by adjusting the appropriate cams, and by closing the manual shut-off valves 94 and 95. This would serve to eliminate additional flow through conduit systems 90, 79 and 137 and through 92, 80 and 137, respectively to and from the conduit 86, so long as the valves 94 and 95 remain closed. Thus, closing off the flow through conduits 79 and 80 by the shut-off valves 94 and 95 serves the same purpose as the operation of the plungers 74 and 76 actuated by the cams 60 and 64. Now, since the passages are closed regardless of the position of the cams, the conduits remain closed both in the downward and upward movements of the drill.

In order to summarize the basic overall operation of the invention, reference may be made to FIGURE 10. There it can be seen that the drill 13 will be raised and lowered as the vane 50 as well as the shaft to which it is attached, is rotated in increments back and forth within some portion of a complete circle, say 270°. It can be seen that in the initial step, the shaft 48 would rotate a small amount in a clockwise direction, as indicated by arrow $m$, during which time the drill 13 makes a fast decent to the vicinity of the work piece 28. Next, a slower descent takes place during the first drilling operation, while the shaft 48 continues rotating a predetermined amount in a clockwise direction, as indicated by the arrow $n$. The drill 13 is then raised to the top of the drilled hole, for the purpose of chip removal, while the shaft 48 rotates in the opposite direction through the same angle as was included in the drilling step, and as indicated by the arrow $o$. This angle could be greater, if it were desired to raise the drill 13 higher, by merely adjusting the particular radial setting of cam 62 on the shaft 48. Then, for the second drilling phase of the operation the drill 13 would once again descend rapidly to the bottom of the previously drilled hole, while the shaft 48 rotates in a clockwise direction through the same angle as just described, and as indicated by the arrow $p$. It can be noted that the cam 64 responsible for the rate of motion $p$ would not be effective at the time the cam 56, involved in the motion $n$ came into play. It is only after the cam 62, initiating motion $o$, has caused certain conduitry to open to the area of the cam 64 that motion $p$ can occur.

The second drilling step would now take place, with the shaft 48 continuing to rotate in a clockwise direction as indicated by the arrow $q$. Next, the second fast ascent of the drill 13 would correspond to the shaft rotation illustrated by the arrow $r$. It is to be understood that the arc represented by the arrow $r$ could include an angle as shown, i.e., equal to that traversed by the arrow $q$, or, if it were desired to raise the drill 13 to a greater height in order to successfully get rid of chips, the shaft 48 and the arrow $r$ could continue in its counterclockwise rotation to include any greater predetermined angle. The next step would be a third fast descent, with the drill 13 traveling to the bottom of the last drilled hole and the shaft 48 rotating as per the arrow $s$. This would be followed by a third, and in this case last, drilling operation, with the shaft 48 continuing to rotate clockwise to its farthermost point, as represented by the arrow $t$. Lastly, the drill 13 would retract to its original starting point, with the shaft correspondingly rotating through 270° to its starting point, as per the arrow $u$.

From the above description of the structure and operation of a specific embodiment of the invention, it is apparent that assorted combinations of feeds and speeds may be obtained by different specific applications of the control mechanism embodied in the invention. It should also be apparent that the invention could be adapted to many uses other than to operate a drill press.

The various accessory features available for use with the unique basic control mechanism make it a versatile and practical automatic control means for use in conjunction with a drill press. These accessory features, as explained above, include a "dull drill feature," a manual emergency "stroke return and shut down" device, an "adjustable dwell feature" for spotfacing and the like, a manual emergency "feed stop" device, and a "fast skip feed" provision for use in operations wherein voids would be encountered.

Thus, although only a single embodiment of the invention, along with various accessory features, has been disclosed and described, other modifications are possible within the scope of the appended claims.

What I claim as my invention is:

1. A feed control mechanism, comprising a connector means for connection with a machine tool, a shaft associated with said connector means, a rotary motor mounted on said shaft, a plurality of cams mounted on said shaft, each of said cams having means for manual angular adjustment on said shaft, a plurality of pilot valves, each of said pilot valves being adapted to be actuated by one of said plurality of cams, a selector valve, a plurality of conduits communicating between said selector valve and said plurality of pilot valves, a second plurality of conduits communicating between said selector valve and said rotary motor, and a supply of fluid in said first and second plurality of conduits for actuating said rotary motor and said shaft alternately in opposite directions.

2. A feed control mechanism, comprising a coupling for connection with a machine tool; a shaft associated with said coupling; a rotary motor mounted on said shaft; a plurality of cams mounted on said shaft, each of said cams having means for manual angular adjustment on said shaft; a plurality of pilot valves, each of said pilot valves adapted for actuation by one of said plurality of cams; a selector valve; a plurality of conduits communicating between said selector valve and said plurality of pilot valves; a second plurality of conduits communicating between said selector valve and said rotary motor; a supply of fluid in said first and second plurality of conduits for actuating said rotary motor and said shaft alternately in opposite directions; and a safety device including a conduit and comprising a lever means for at times actuating one of said plurality of pilot valves in lieu of actuation thereof by one of said cams; a piston means for actuating said lever means; and a conduit communicating between said rotary motor and said piston means.

3. A feed control mechanism, comprising a coupling for connection with a machine tool, a shaft associated with said coupling, a fluid motor having a vane fixedly attached to said shaft, a plurality of cams mounted on said shaft, each of said cams having means for manual angular adjustment thereof on said shaft, a pivotally mounted lever adjacent each of said cams for at times being actuated thereby, each of said levers having resilient means for snapping said lever away from its associated cam upon reaching a predetermined contact relationship with said cam, a pilot valve for each of said cams and adapted to be actuated by one of said levers, a selector valve, a plurality of conduits communicating between said selector valve and said pilot valves, a second plurality of conduits communicating between said selector valve and said fluid motor, and a supply of fluid in said first and second plurality of conduits for actuating said fluid motor and said shaft alternately in opposite directions.

4. A feed control mechanism, comprising a reservoir, a pump, a connector means for connection with a machine tool, a shaft associated with said connector means, a vane fixedly attached to said shaft for rotation therewith, a stationary housing surrounding said vane and forming first and second chambers therewith, a selector means, a first conduit supplying low pressure fluid from said reservoir to said selector means, a second conduit supplying high pressure fluid from said reservoir to said selector valve, third and fourth conduits communicating between said selector valves and said first and second chambers, respectively, said selector valve at times permitting access between said first and said third conduits and between said second and said fourth conduits such that high pressure fluid will rotate said vane, first cam means attached to said shaft, means for at times eliminating a portion of the supply of high pressure fluid through said second conduit, said last named means being actuated by said first cam means so as to cause a slower rotation of said vane in said stationary housing, a second cam means attached to said shaft for rotation therewith, a pilot means for at times being actuated by said second cam means, a fifth conduit communicating between said pilot means and said selector means, a sixth conduit communicating between said reservoir and said fifth conduit for at times supplying low pressure fluid thereto, a seventh conduit communicating between said pump and said fifth conduit for at times supplying high pressure fluid thereto, said pilot means permitting the passage of high pressure fluid to said selector means through said fifth conduit from said seventh conduit in place of low pressure fluid from said sixth conduit upon being actuated by said second cam means, said selector means being repositioned by said high pressure fluid thereby permitting the passage of high pressure fluid from said second conduit to said first chamber via said third conduit and the passage of low pressure fluid from said first conduit to said second chamber via said fourth conduit for rotating said vane in the opposite direction.

5. In combination with the structure recited in claim 4, third cam means attached to said shaft for rotation therewith, a second pilot means, said second pilot means at times being actuated by said third cam means, said second pilot means permitting the passage of low pressure fluid in said fifth conduit from said sixth conduit to said selector means in place of high pressure fluid from said seventh conduit upon being contacted by said third cam means, resilient means for actuating said selector means when said selector means is subjected to low pressure fluid through said fifth conduit, said selector means permitting the passage of low pressure fluid from said first conduit to said first chamber via said third conduit and the passage of high pressure fluid from said second conduit to said second chamber via said fourth conduit upon actuation by said resilient means so as to rotate said vane and said shaft in a reverse direction.

6. A feed control mechanism, comprising a connector means for connection with a machine tool, a shaft associated with said connector means, a hydraulic motor rotatably mounted on said shaft, a cam fixedly attached to said shaft, a pilot valve, a first lever means pivotally located between said cam and said pilot valve for actuation of said pilot valve upon being contacted by said cam, a selector valve, a plurality of conduits communicating between said selector valve and said pilot valve, a second plurality of conduits communicating between said selector valve and said hydraulic motor, a second lever means adapted to at times contact said first lever means so as to pivot said first lever means against said pilot valve, a resilient means biasing said second lever means away from said first lever means, a piston means for at times causing said second lever means to contact said first lever means, a conduit communicating between one side of said hydraulic motor and said piston means for at times actuating said piston means.

7. A feed control mechanism, comprising a connector means for connection with a machine tool, a shaft associated with said connector means, a hydraulic motor rotatably mounted on said shaft, a cam fixedly attached to said shaft, a pilot valve, a first lever means pivotally located between said cam and said pilot valve for actuation of said pilot valve upon being contacted by said cam, a selector valve, a plurality of conduits communicating between said selector valve and said pilot valve, a second plurality of conduits communicating between said selector valve and said hydraulic motor, a second lever means adapted to at times contact said first lever means so as to pivot said first lever means against said pilot valve, a resilient means biasing said second lever means away from said first lever means, a piston means for at times causing said second lever means to contact said first lever means, a conduit communicating between one side of said hydraulic motor and said piston means for at times actuating said piston means, a manual means for actuating said piston means and a second resilient means for biasing said manual means away from said piston means.

8. A feed control mechanism comprising a fluid reservoir, a connector means for connection with a machine tool, a shaft associated with said connector means, a hydraulic motor rotatably mounted on said shaft, a cam fixedly attached to said shaft, a pilot valve, a first lever means pivotally located between said cam and said pilot valve for actuation of said pilot valve upon being contacted by said cam, a selector valve, a plurality of conduits communicating between said selector valve and said pilot valve, a second plurality of conduits communicating between said selector valve and said hydraulic motor, a second lever means adapted to at times contact said first lever means so as to pivot said first lever means against said pilot valve, a resilient means biasing said second lever means away from said first lever means, a piston means for at times causing said second lever means to contact said first lever means, a conduit communicating between one side of said hydraulic motor and said piston means for at times actuating said piston means, an accumulator assembly, said accumulator assembly comprising a chamber, a passageway communicating between said chamber and said piston means, a second piston means slidably located in said chamber, a second resilient means biasing said second piston means toward said passageway, a manually adjustable means for limiting the movement of said second piston means in a direction away from said passageway, a conduit communicating between said chamber and said reservoir, and a manually adjustable stop means associated with said machine tool for limiting the downward movement of the spindle thereof.

9. A feed control mechanism, comprising a coupling for connection with a machine tool; a shaft associated with said coupling; a rotary motor mounted on said shaft; a plurality of cams mounted on said shaft, each of said cams having means for manual angular adjustment on said shaft; a plurality of pilot valves, each of said pilot valves adapted for actuation by one of said plurality of cams; a selector valve; a plurality of conduits communicating between said selector valve and said plurality of pilot valves; a pair of manually controlled valves incorporated in two of said plurality of conduits for at times blocking the flow through said two conduits to said selector valve; a second plurality of conduits communicating between said selector valve and said rotary motor; a supply of fluid in said first and second plurality of conduits for actuating said rotary motor and said shaft alternately in opposite directions; and a safety device including a conduit and comprising a lever means for at times actuating one of said plurality of pilot valves in lieu of actuation thereof by one of said cams; a piston means for actuating said lever means; and a conduit communicating between said rotary motor and said piston means.

References Cited by the Examiner

UNITED STATES PATENTS

| | | | |
|---|---|---|---|
| 2,005,018 | 6/35 | West | 60—52 |
| 2,429,189 | 10/47 | Maddox | 91—407 |
| 2,994,303 | 8/61 | Robra | 91—27 |
| 3,052,136 | 9/62 | Schmitz | 91—7 |
| 3,059,663 | 10/62 | Whitenack | 91—136 |

FRED E. ENGELTHALER, *Primary Examiner.*